(12) United States Patent
Davis et al.

(10) Patent No.: US 10,191,614 B2
(45) Date of Patent: Jan. 29, 2019

(54) PANEL DISPLAYING METHOD, PORTABLE ELECTRONIC DEVICE AND RECORDING MEDIUM USING THE METHOD

(71) Applicant: HTC Corporation, Taoyuan (TW)

(72) Inventors: Shawna Julie Davis, Seattle, WA (US); Kuang-Ting Chuang, Taoyuan (TW); Shih-Pin Lin, Taoyuan (TW); Chia-Hung Kao, Taoyuan (TW); Chia-Yuan Chang, Taoyuan (TW); Chih-Wei Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 191 days.

(21) Appl. No.: 15/051,635

(22) Filed: Feb. 23, 2016

(65) Prior Publication Data

US 2016/0246478 A1 Aug. 25, 2016

Related U.S. Application Data

(60) Provisional application No. 62/120,385, filed on Feb. 25, 2015.

(51) Int. Cl.
*G06F 3/0481* (2013.01)
*G06F 3/0482* (2013.01)
(Continued)

(52) U.S. Cl.
CPC .......... *G06F 3/04817* (2013.01); *G06F 3/017* (2013.01); *G06F 3/0482* (2013.01);
(Continued)

(58) Field of Classification Search
CPC .............. G06F 3/04817; G06F 3/0482; H04M 1/72569
See application file for complete search history.

(56) References Cited

U.S. PATENT DOCUMENTS 8,037,421 B2 * 10/2011 Scott ................. H04M 1/72586
715/811
8,370,768 B2 * 2/2013 Kubo .................... G06F 3/0482
715/811
(Continued)

FOREIGN PATENT DOCUMENTS

EP 2469813 6/2012

OTHER PUBLICATIONS

"Search Report of European Counterpart Application," dated Jun. 24, 2016, p. 1-12.

*Primary Examiner* — Omar R Abdul-Ali
(74) *Attorney, Agent, or Firm* — JCIPRNET

(57) ABSTRACT

A panel displaying method for an electronic device is provided. The electronic device includes a display module and has a plurality of first icons corresponding to a plurality of objects. The panel displaying method includes: determining an environment of the electronic device; automatically choosing an operation mode based on the environment of the electronic device. The operation mode is displayed in a widget area of a first panel and includes at least one widget icon. A portion of the first icons is chosen and updated as the widget icon based on numbers of clicks of the first icons in the chosen operation mode. Moreover, a portable electronic device and a recording medium using the method are also provided.

11 Claims, 4 Drawing Sheets

(51) Int. Cl.
    *G06F 9/451*     (2018.01)
    *G06F 9/44*      (2018.01)
    *G06F 3/01*      (2006.01)
    *H04M 1/725*     (2006.01)

(52) U.S. Cl.
    CPC ............ *G06F 9/4443* (2013.01); *G06F 9/451* (2018.02); *H04M 1/72566* (2013.01); *H04M 1/72569* (2013.01); *H04M 1/72572* (2013.01)

(56) References Cited

U.S. PATENT DOCUMENTS

| | | |
|---|---|---|
| 2009/0248996 A1 | 10/2009 | Mandyam et al. |
| 2010/0293508 A1* | 11/2010 | Hwang ............... G06F 3/04886 715/846 |
| 2011/0185283 A1 | 7/2011 | Jun et al. |
| 2012/0015693 A1 | 1/2012 | Choi et al. |
| 2012/0023431 A1 | 1/2012 | Roth et al. |
| 2013/0130669 A1 | 5/2013 | Xiao et al. |
| 2013/0219319 A1* | 8/2013 | Park ...................... G06F 3/0488 715/775 |
| 2014/0143568 A1* | 5/2014 | Kim ...................... G06F 1/3206 713/323 |
| 2015/0058744 A1* | 2/2015 | Dhingra .................. G06F 9/451 715/747 |

* cited by examiner

| | work mode | home mode | out mode |
|---|---|---|---|
| location | $L_1$ | $L_2$ | $L_3$ |
| wireless network domain | $W_1$ | $W_2$ | $W_3$ |
| Bluetooth connection information | $B_1$ | $B_2$ | $B_3$ |
| time | $T_1$ | $T_2$ | $T_3$ |
| ⋮ | ⋮ | ⋮ | ⋮ |

PANEL DISPLAYING METHOD, PORTABLE ELECTRONIC DEVICE AND RECORDING MEDIUM USING THE METHOD

CROSS REFERENCE TO RELATED APPLICATION

This application claims the priority benefit of U.S. provisional application Ser. No. 62/120,385, filed on Feb. 25, 2015. The entirety of the above-mentioned patent application is hereby incorporated by reference herein and made a part of specification.

BACKGROUND OF THE INVENTION

1. Field of the Invention

The invention relates to a displaying method, an electronic device, and a recording medium, and particularly relates to a panel displaying method, a portable electronic device, and a recording medium using the method.

2. Description of Related Art

In recent years, portable electronic devices, such as smartphones, have been commonly used. Portable electronic devices may have various functions and have gradually changed the habits of people.

Nowadays, the operating systems of most portable electronic devices offer functions of widgets and shortcuts on a panel. The user may arrange the panel of the portable electronic device using the widgets and shortcuts based on his/her own preferences. However, the scenarios for user's daily life are not constant. In respective circumstance, there may correspondingly be multiple frequently used applications. Nevertheless, in the conventional portable electronic device, the panel arrangement of the portable electronic device is usually fixed and does not change in correspondence with the user's circumstances, making the portable electronic device less convenient to use. Thus, how to provide a convenient panel displaying method is an issue for relevant researchers to work on.

SUMMARY OF THE INVENTION

The invention provides a panel displaying method, a portable electronic device, and a recording medium using the method capable of switching contents displayed in a panel based on an environment and a circumstance of the user.

A panel displaying method according to an embodiment of the invention is suitable for an electronic device having a display module. The electronic device has a plurality of first icons corresponding to a plurality of objects. The panel displaying method includes steps as follows. An environment of the electronic device is determined. An operation mode is automatically chosen based on the environment of the electronic device. The operation mode is displayed in a widget area of a first panel and includes at least one widget icon. A portion of the first icons is chosen and updated as the widget icon based on numbers of clicks of the first icons in the chosen operation mode.

A portable electronic device according to an embodiment of the invention includes a display module, an input module, a storage module, and a processor. The display module is adapted to display a panel. The input module is adapted to receive an input signal. The storage module is adapted to store a plurality of objects and a plurality of first icons corresponding to the objects. The processor is coupled to the display module, the input module, and the storage module. The processor determines an environment of the portable electronic device and automatically chooses an operation mode based on the environment. The operation mode is displayed in a widget area of a first panel and includes at least one widget icon. A portion of the first icons is chosen and updated as the widget icon based on the numbers of clicks of the first icons in the chosen operation mode.

A non-transitory computer readable recording medium according to an embodiment of the invention is suitable to record a computer program. The computer program is loaded by an electronic device to perform steps as follows. An environment of the electronic device is determined and an operation mode is automatically chosen based on the environment. The operation mode is displayed in a widget area of a first panel and includes at least one widget icon. A portion of the first icons is chosen and updated as the widget icon based on the numbers of clicks of a plurality of objects corresponding to a plurality of first icons in the chosen operation mode.

Based on above, the panel displaying method according to the invention is able to automatically choose different operation modes based on the environment of the electronic device, and the operation mode is displayed in the widget area and includes at least one widget icon. Therefore, the displaying of the panel may become more flexible in accordance with the change of environment, and the characteristic of mobile device thus becomes more salient.

In order to make the aforementioned and other features and advantages of the invention comprehensible, several exemplary embodiments accompanied with figures, are described in detail below.

DESCRIPTION OF THE EMBODIMENTS

Figure 1:
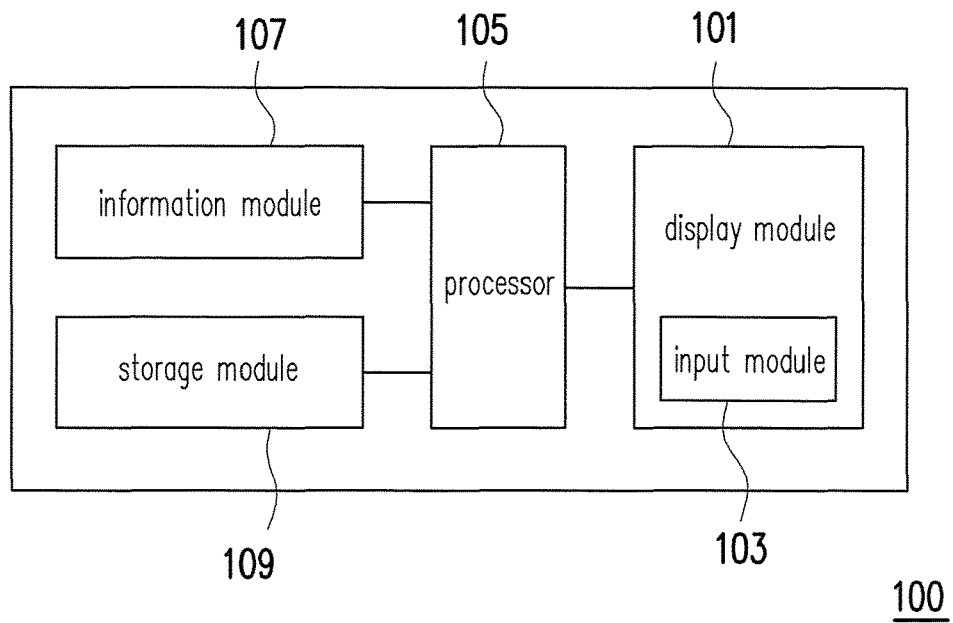
FIG. 1 is a block view illustrating an electronic device according to an embodiment of the invention.
Figure 2:
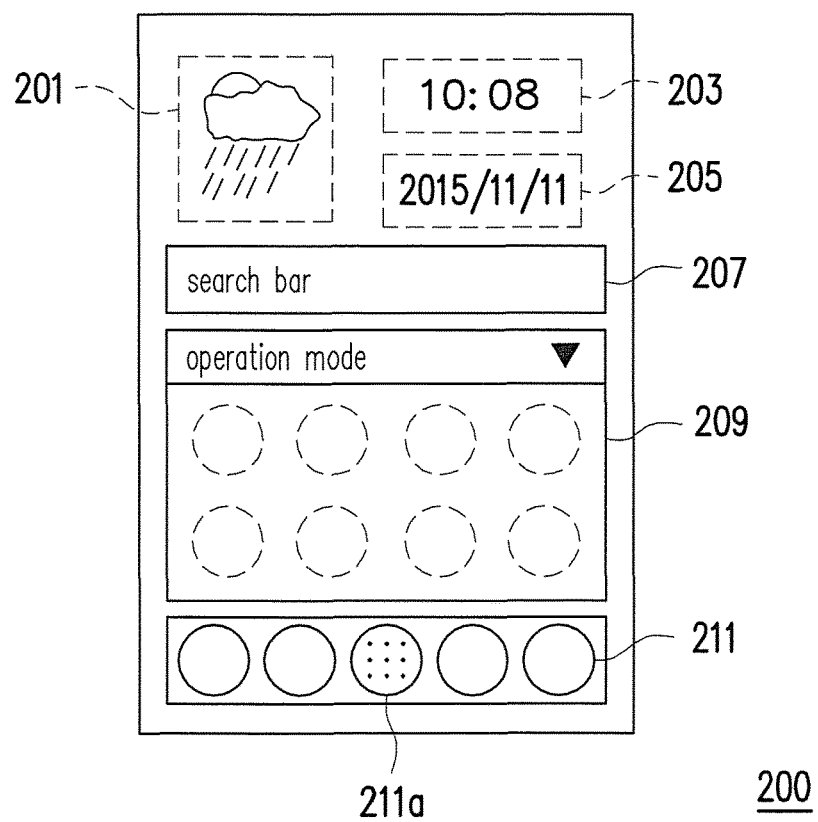
FIG. 2 is a schematic view illustrating a displaying panel according to an embodiment of the invention.

FIG. 1 is a block view illustrating an electronic device according to an embodiment of the invention. FIG. 2 is a schematic view illustrating a displaying panel according to an embodiment of the invention.

Referring to FIG. 1, in an embodiment of the invention, an electronic device 100 may be a portable electronic device comprising, for example, a mobile phone, a tablet computer, etc. The electronic device 100 has a display module 101, an input module 103, a processor 105, an information module 107, and a storage module 109. The display module 101 is adapted to receive an image signal or an audio-visual signal from the processor 105 and display the received image signal or audio-visual signal accordingly. The display module 101 is, for example, a liquid crystal display or a touch screen of various types; however, the invention is not limited thereto. In an embodiment of the invention, the input module 103 and the display module 101 are treated as a whole and implemented as a touch screen. For example, the input module 103 may be implemented by covering a pressure sensing layer on a display panel of the display module 101. When a pressure is applied on the input module 103, a current signal or a resistance change may be generated to determine a position where the pressure is applied. By incorporating the input module 103, the display module 101 also exhibits a function of touch input when displaying an image or audio-visual contents. For example, the input module 103 may generate a uniform electric field on the display panel of the display module 101 through electrode discharging. When a conductive substance approaches the panel, a capacitance on the panel may differ. A position of the conductive substance on the panel is calculated accordingly, so as to accomplish the function of touch input of the display module 101. In other words, in an embodiment of the invention, a combination of the input module 103 and the display module 101 may be a touch screen such as a resistive touch screen, a capacitive touch screen, etc.; however, the invention is not limited thereto. Furthermore, in another embodiment of the invention, the display module 101 and the input module 103 may be implemented as two separate components, such as a liquid crystal display and a physical keyboard or roller of a mobile phone.

The processor 105 is coupled to the display module 101, the input module 103, the information module 107, and the storage module 109, and adapted to control the overall operation of the electronic device 100. In an embodiment of the invention, the processor 105 may be, for example, a dual-core, quad-core, or octa-core central processing unit (CPU), a system-on-chip (SOC), an application processor, a media processor, a microprocessor, a digital signal processor, or the like. The invention does not intend to impose a limitation on the processor being used in the actual use.

The information module 107 is adapted to detect device information of the electronic device 100. The device information includes location information, behavior information, and application information. More specifically, the location information is, for example, the location or environment of the electronic device 100. The information module 107 may determine the location information of the electronic device 100 by using a wireless network connection state or positioning information of the electronic device 100. The behavior information relates to an operational behavior of the electronic device 100 for the time being. For example, the information module 107 may determine the behavior information of the electronic device 100 based on an application that the electronic device 100 currently runs, a function that the electronic device 100 currently performs, or even connection states of various sensors and/or input/output interfaces of the electronic device 100. The application information of the electronic device 100 comes from the applications installed in the electronic device 100. In an embodiment of the invention, the information module 107 may include components such as the global positioning system (GPS) or other positioning systems, a communication module compatible with various network communication standards, an acceleration sensor, a gyroscope, various input/output interfaces, and various sensors. Specifically, the information module 107 may collect various information relating to the electronic device 100.

The storage module 109 is adapted to store various data of the electronic device 100, such as applications, shortcuts, folders, and corresponding icons, etc. In an embodiment of the invention, the storage device 109 includes a hard disk, a random access memory adapted to store a procedure for short-term use, and a read-only memory (ROM) adapted to store data, the operating system or serve as system cache, etc. However, the invention is not limited thereto. In another embodiment of the invention, the storage device 109 further includes another storage medium adapted to record data.

Referring to FIG. 2, in an embodiment of the invention, the display module 101 may display a panel after the electronic device 100 is unlocked or turned on. The user may click on or touch any position on the panel by using the input module 103 to open a corresponding application or edit a widget. In this embodiment, the display module 101 and the input module 103 are integrated in the touch screen of the electronic device 100, for example. In an embodiment of the invention, the electronic device 100 may include a plurality of panels. A first panel 200 is a main panel of the electronic device 100 and may include a weather area 210, a time area 203, a date area 205, a search bar 207, a widget area 209, and a fixed tool bar 211. In an embodiment of the invention, the user may switch between different panels by using a slide gesture or clicking on icons representing different panels in the panel displayed by the display module 101. In another embodiment of the invention, the first panel 200 may also include the fixed tool bar 211. The fixed tool bar 211 includes a plurality of icons corresponding to applications or application folders set in default in the systems or by the user and an application pool open icon 211a. In addition, the position and contents of the fixed tool bar 211 may remain the same across the panels, for example. Here, the application pool open icon 211a may be displayed at other positions on the desktop or the application pool may be opened by triggering a button or by other means, and not be displayed in the fixed tool bar 211. In addition, the application pool open icon 211a is adapted to open the application pool of the electronic device 100 and includes applications built in or downloaded to the electronic device 100 for the user to use and icons corresponding to the applications. The widget area 209 in the first panel 200 may display a plurality of widget icons included in the icons. Here, the widget icons specifically refer to icons displayed in the widget area. In other words, the electronic device 100 has a plurality of icons (also referred to as first icons). Each of the first icons corresponds to an application, a shortcut, or a folder, and the widget icons specifically refer to a portion of the first icons displayed in the widget area. In an embodiment of the invention, the widget icons displayed in the widget area 209 may change in accordance with an operation mode chosen by the processor 105, for example. Here, the widget area 209 may refer to a specific area on the desktop, and may also be a widget addable to the desktop. The size of the specific area or the widget may be fixed or adjustable based on the user's needs, and the number of widget icons included in the widget area 209 may be determined based on the adjusted size, or the size may be automatically adjusted based on the number of widget icons included in the widget area 209.

In addition, the electronic device 100 may offer a plurality of operation modes for choice. For example, the electronic device 100 may, in default, provide a work mode, a home mode, and an out mode for choice, and the user may, based on his/her habits of using the electronic device 100 or the location where he/she uses the electronic device 100, add or delete different operation modes to meet the needs. In an embodiment of the invention, the display module 101 displays, for example, the first panel 200, and the respective operation modes may include, for example, mode names and a plurality of widget icons and are displayed in the widget area 209. If the display module 101 displays the first panel 200, and the electronic device 100 chooses the work mode, the processor 105 may choose and update a portion of the first icons and display the portion of the first icons as the widget icons based on, for example, the numbers of clicks of objects corresponding to the first icons when the electronic device 100 is in the work mode. In other words, the widget area 209 of the first panel 200 may display the widget icons corresponding to the operation mode chosen by the electronic device 100, and is adjustable based on functions corresponding to the first icons commonly clicked or used by the user.

Figures 3, 4:
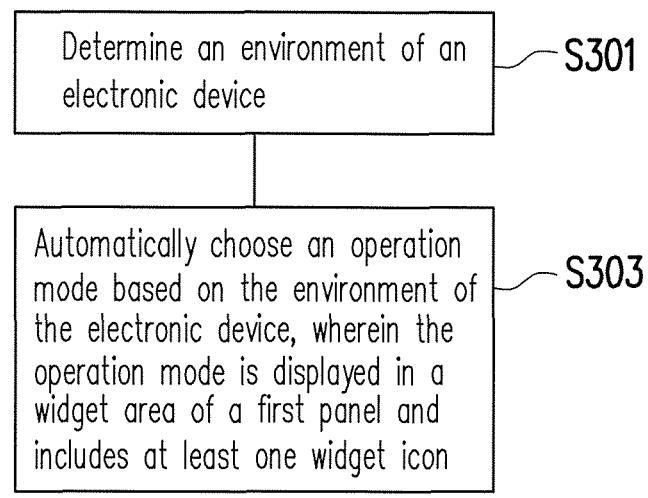
FIG. 3 is a flowchart illustrating a panel displaying method according to an embodiment of the invention.
FIG. 4 is a schematic view illustrating a corresponding relation between the device information and respective operation modes set by the user according to an embodiment of the invention.

FIG. 3 is a flowchart illustrating a panel displaying method according to an embodiment of the invention.

Referring to FIG. 3, at Step S301, the processor 105 of the electronic device 100 may determine the environment of the electronic device 100 based on the various device information obtained by the information module 107. In an embodiment of the invention, the processor 105 may, for example, determine the location of the electronic device 100 based on the GPS or other positioning systems of the information module 107, so as to determine the environment of the electronic device 100. It should be noted that it is not mandatory that the environment of the electronic device 100 is determined by the location information. In other embodiments, the environment of the electronic device 100 may be determined by considering the device information of the device obtained by the information module 107, the device information of any device, or a combination of the device information of a plurality of devices. Details of implementation in this respect are described in the following.

After determining the environment of the electronic device 100, at Step S303, the processor 105 may automatically choose the operation mode based on the environment of the electronic device 100. In an embodiment of the invention, the user may set by using the input mode 103 that the work mode corresponds to a workplace address, and the home mode corresponds to a home address. After the setting completes, if the processor 105 determines that the electronic device 100 is at the workplace address, the processor 105 may automatically choose the operation mode as the work mode, and if the processor 105 determines that the electronic device 100 is at the home address, the processor 105 may automatically choose the operation mode as the home mode. It should be noted that the number of environments corresponding to the work mode is not limited. In other words, the work mode may correspond to multiple environments (i.e., "one-to-multiple"). For example, when the processor 105 determines that the electronic device 100 is located at the workplace address or its surrounding, or at two or more different workplace addresses or workplace locations, the processor 105 may all determine that the environment is a workplace environment and choose the work mode. Besides, when the processor 105 determines that the electronic device 100 is located at the home address or its surrounding, or at two or more different home addresses, the processor 105 may automatically choose the operation mode as the home mode.

In an embodiment of the invention, the operation modes available for choice in the electronic device 100 include, for example, the work mode, the home mode, and the out mode. The work mode corresponds to the user's workplace environment, the home mode corresponds to the user's home environment, and the out mode corresponds to an environment where the user is out. The electronic device 100 chooses the operation mode based on the environment of the electronic device 100. However, the environment of the electronic device 100 is not limited to the location of the electronic device 100. In general, the electronic device 100 may determine the environment of the electronic device 100 based on the device information accessible by the information module 107 of the electronic device 100. For example, the work environment of the user may correspond to a fixed work address, fixed working hours, and a fixed environment, a device connected to the electronic device 100, or a Wi-Fi hotspot or a communication device of a base station connected to the electronic device 100. Thus, the electronic device 100 may determine the environment of the electronic device 100 based on such information, so as to choose the corresponding operation mode. Namely, the user may set corresponding relations between device information such as location, time, or other parameter conditions and the respective operation modes, such that the electronic device 100 may automatically choose or switch among operation modes based on the corresponding device information or in the corresponding environment.

In addition, in another embodiment of the invention, the user may also manually switch among or choose one of the operation modes by using the input module 103. Furthermore, in another embodiment of the invention, when the electronic device 100 is used for the first time or the first couple of times, if the user manually changes the operation anode for a predetermined number of times (e.g., 3 times), it may indicate that the electronic device 100 does not automatically determine the device information or environments that different modes corresponds to respectively. Under such circumstance, the processor 105 may send a specific notification such that the user may set by him/herself the device information or environments of the electronic device 100 corresponding to the respective operation modes, such as environment parameters including the locations, Wi-Fi hotspots, base stations for communications, etc., corresponding to the operation modes. Afterwards, the processor 105 may choose one of the operation modes based on the environment of the electronic device 100.

FIG. 4 is a schematic view illustrating a corresponding relation between the device information and respective operation modes set by the user according to an embodiment of the invention. As shown in FIG. 4, if the user sets that a location L1 and/or a wireless network domain W1 correspond to the work mode, and a location L2 and/or a wireless network domain W2 correspond to the home mode, when the GPS or other positioning systems of the electronic device 100 detects that the electronic device 100 is located at the location L1 or the communication module of the electronic device 100 detects that the electronic device 100 is in the wireless network domain W1, the processor 105 may automatically choose the work mode, and when the GPS of the electronic device 100 detects that the electronic device 100 is located at the location L2 or the communication module of the electronic device 100 detects that the electronic device 100 is in the wireless network domain W2, the processor 105 may automatically choose the home mode. Details concerning how the processor 105 automatically chooses the operation mode are described in the following.

In this embodiment, the environment of the electronic device 100 is determined based on the device information of location and wireless network domain. However, the invention is not limited thereto. In other embodiments, the device information that the electronic device 100 may obtain via the information module 107 includes location information capable of specifying a specific location, such as Bluetooth connection information, mobile network base station information (e.g., LTE, GPRS, or WiMAX), etc., or behavior information of the electronic device 100 such as whether a universal serial bus (USB) is connected, whether a charger is connected, sensor information (e.g., whether the device is moving with a vehicle or remains still), whether a car dock is connected/disconnected, whether a desk dock is connected, etc. Furthermore, the device information further includes time information. The various device information, including time information, may be used separately or in combination to determine the environment of the electronic device 100, so as to choose the current operation mode by taking more factors into account. In an embodiment of the invention, the processor 105 further sets weighting values corresponding to the respective device information to weight the respective operation mode, so as to determine the environment of the electronic device 100 and choose the operation mode by taking all the factors into account. For example, if the car dock of the electronic device 100 is connected, and the device information may be used to increase weighting of the out mode relative to other operation modes, the processor 105 of the electronic device 100 may increase the weighting of the out mode based on the information and the corresponding weighting value. In another example, if the current time of the electronic device 100 is 11:00 A.M., Monday, and the device information may be used to increase weighting of the work mode relative to other operation modes, the processor 105 of the electronic device 100 may increase the preference to the work mode based on the device information. Further to setting the weighting values of the respective device information to weight the respective operation modes, in another embodiment of the invention, the processor 105 may also set a way of choosing the operation mode by taking into account the various device information based on the needs in use. In other words, the invention does not intend to impose a limitation on how the device information is considered to determine the environment of the electronic device 100.

Moreover, in an embodiment, when the electronic device 100 does not set the geographic locations corresponding to the different modes (e.g., the home mode and the work mode), the device information capable of specifying a specific location, including, for example, Bluetooth connection information, mobile network base station information (e.g., LTE, GPRS, or WiMAX), behavior information of the electronic device 100 such as whether a universal serial bus (USB) is connected, whether a charger is connected, sensor information (e.g., whether the device is moving with a vehicle or remains still), whether a car dock is connected/disconnected, whether a desk dock is connected, the time information, the calendar information, the specific software execution information, etc., may be used as reference to automatically determine the geographic locations corresponding to the different modes, so as to serve as basis in switching between different modes. For example, if the name of the connected Wi-Fi hotspot includes a related keyword, such as home, work, company name, etc., it may be determined that the location of the connected Wi-Fi hotspot is the geographic location of the work mode or the home mode. If the electronic device 100 is connected to the charger or the desk dock during working hours, it may be determined that the location is the geographic location of the work mode. If the electronic device 100 is connected to the charger or the desk dock during off hours, it may be determined that the location is a geographic location of the home mode. If a moving mode of the electronic device 100 is driving, or the electronic device 100 is connected to a car dock, it may be determined that an initial location of driving or a location where the car dock becomes connected is the geographic location corresponding to the home mode, and an end location of driving or a location where the car dock becomes disconnected is the geographic location corresponding to the work mode. Locations during the working hours and the off hours may be respectively determined as the geographic locations corresponding to the work mode and the home mode. Locations where specific software such as alarm clock and TV remote controller is executed may be determined as the geographic locations corresponding to the home mode, and a meeting location in the calendar may be determined as the geographic location corresponding to the work mode. In another embodiment, the above information may be combined together and assigned with different weighting values, so as to automatically determine the geographic locations corresponding to the home mode and the work mode.

It should be noted that, in an embodiment of the invention, the processor 105 may further perform an additional analysis on the obtained device information to make the chosen operation mode more accurate. For example, assuming that the wireless network domain detected by the communication module of the electronic device 100 does not change, even if the connection state of the desk dock changes, and the position detected by the GPS also changes slightly, the process 105 does not change the determined environment of the electronic device 100, and does not switch the chosen operation mode, either, as long as the position detected by the GPS is still within a predetermined range.

In an embodiment of the invention, further to the device information available from hardware, the information module 107 may also use application information obtained from the application of the electronic device 100 as device information, and use such device information to determine the environment of the electronic device 100. For example, when various application information, such as an alarm clock being triggered, a meeting event in the calendar being triggered and the meeting location being a specific location (e.g., office, meeting room, telephone meeting at home, etc.), a software for work being executed, a TV remote controller being set or used, a phone synchronization management software, or a telephone meeting function, etc., is obtained, the processor 105 may determine the environment of the electronic device 100 based on the application information, so as to choose one of the operation modes. In an embodiment of the invention, when the alarm clock is triggered, the processor 105 determines that the electronic device 100 is more likely to be in a household environment and tends to choose the operation mode as the home mode. Similarly, when the function of TV remote controller is turned on, the device information will lead the processor 105 to prefer home mode over other operation modes. In another embodiment of the invention, the processor 105 may take all the device information obtained from hardware and software into account and weight, or perform other processes on, the device information to determine the environment of the electronic device 100, so as to choose one of the operation modes.

In an embodiment of the invention, the processor 105 may automatically detect device information such as location, wireless network domain, mobile network base station information, Bluetooth connection information, acceleration information, and time, etc., every 30 minutes and switch between the operation modes based on the detected device information. In another embodiment of the invention, when the information module 107 senses that the location or behavior of the electronic device 100 changes, the information module 107 may trigger the processor 105 to automatically detect the respective device information of the electronic device 100 to determine the environment of the electronic device 100. For example, when the information module 107 senses that the wireless network domain is changed, the mobile network base station is switched, the states of various connectors are changed, the Bluetooth connection information is changed, or the connection state of the USB is changed, the processor 105 may be triggered by these factors to detect the various device information of the electronic device 100 again to determine the environment of the electronic device 100, so as to choose the operation mode of the electronic device 100. Moreover, in another embodiment of the invention, when the alarm clock is triggered, the meeting event in the calendar is triggered, the work software is being executed, the TV is being set, the phone synchronization management software or the telephone meeting function is triggered, the processor 105 may detect the various device information of the electronic device 100 again, so as to determine the environment of the electronic device 100 and thereby choose the operation mode of the electronic device 100.

In an embodiment of the invention, in addition to the processor 105 automatically choosing one of the operation mode, if the user uses the input module 103 to manually switch the operation mode of the electronic device 100, the processor 105 may choose the operation mode instructed by the user based on a mode input signal that is received. In another embodiment of the invention, if the user repetitively switches the operation mode chosen by the electronic device 100 to another operation mode for a predetermined number of times (e.g., five times) when the device information of the electronic device 100 is in the same state, the processor 105 may automatically determine that the operation mode originally chosen or determined based on the device information of the environment needs to be adjusted, and again request the user to set the corresponding relation between the respective device information and the respective operation modes or directly match the device information in the state to the operation mode manually switched by the user.

In an embodiment of the invention, after the electronic device 100 chooses the operation mode, when the display module 101 displays the first panel 200, at least one widget icon may be simultaneously displayed in the widget area 209 of the first panel 200, for example. The widget icon is chosen to be displayed in the widget area 209 based on the numbers of clicks of the objects corresponding to the first icons of the electronic device 100 in the chosen operation mode, for example.

Figure 5:
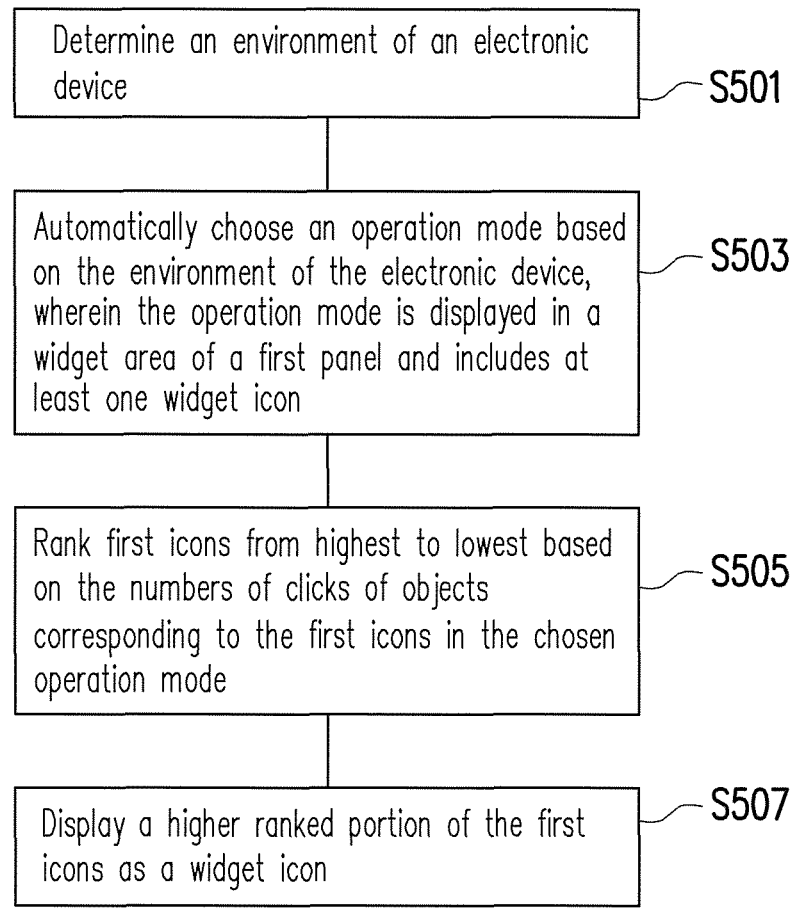
FIG. 5 is a flowchart illustrating a panel displaying method according to another embodiment of the invention.

FIG. 5 is a flowchart illustrating a panel displaying method according to an embodiment of the invention.

Referring to FIG. 5, Step S501 and Step S503 are similar to Step S301 and Step S303 in FIG. 3, and are thus not repeated in the following. In an embodiment of the invention, after the electronic device 100 chooses the operation mode at Step S503, the processor 105 may choose a default icon in the chosen operation mode as the widget icon displayed in the widget area 209 of the first panel 200. In addition, the processor 105 may rank the first icons from the highest to the lowest based on the numbers of clicks of the objects corresponding to the first icons in the chosen operation mode. In an embodiment of the invention, when the user uses the electronic device 100, the processor 105 may calculate the numbers of clicks of the objects corresponding to the respective first icons of the electronic device 100 in the respective operation modes. Here, each of the first icons may correspond to an application, a shortcut, or a folder, etc.

TABLE 1

|  | Application | Shortcut | Folder |
| --- | --- | --- | --- |
| Application Pool | Yes | N/A | None |
| Main Panel | Yes | Yes | None |
| Widget Area | Yes | Yes | Yes |

For example, referring to Table 1, the processor 105 may respectively calculate the numbers of clicks of the first icons respectively corresponding to applications, shortcuts, and folders in the application pool, the main panel as a homepage, and the widget area. Here, the main panel in Table 1 refers to a part of the panel that is not the widget area 209 after the display module 101 of the electronic device 100 is unlocked. For example, the processor 105 may calculate the numbers of clicks of the first icons corresponding to applications in the application pool, the main panel, and the widget area 209 respectively, and the processor 105 may also calculate the numbers of clicks of the first icons corresponding to shortcuts in the main panel and the widget area 209. It should be noted that, since the application pool collects the applications installed in the electronic device 100, it does not include the shortcuts of the applications set by the user. Thus, "N/A" is used in Table 1 for this category. Moreover, in an embodiment of the invention, the processor 105 may only calculate the numbers of times that the folders in the widget area 209 are opened without calculating the numbers of times that the folders in the application pool or the main panel are opened. In another embodiment, the numbers of times that all the folders are opened are calculated. In yet another embodiment, the numbers of clicks of the icons in the folders, instead of the numbers of times that the folders are opened, are calculated.

At Step S505, after the processor 105 calculates the numbers of clicks of the objects corresponding to the first icons in the respective operation modes, the processor 105 may rank the corresponding first icons from the highest to the lowest based on the numbers of clicks of the objects calculated. Then, at Step S507, the processor 105 may display the higher ranked first icons as the widget icons, or display the first icons that are higher ranked and have the numbers of clicks exceeding a threshold as the widget icons. In an embodiment of the invention, the number of first icons that are displayed as widget icons is determined by the maximum number of icons that the widget area 209 is able to accommodate. Taking FIG. 2 as an example, since the range of the widget area 209 is able to accommodate eight icons, the processor 105 may display the eight highest ranked icons, i.e., eight icons with the most numbers of clicks, in the chosen operation mode as the widget icons. In an embodiment, if the user just starts using the electronic device 100, and the number of the ranked icon does not reach the maximum number of icons that the widget area 209 is able to accommodate, only the first icons currently ranked are displayed as the widget icons.

Even though in the embodiment, the widget area 209 is only able to accommodate eight widget icons, the invention is not limited thereto. The number of icons that the range of the widget area 209 is able to accommodate may be set and adjusted based on the user's habits of use. In another embodiment of the invention, the user may edit the size of the widget area 209 by, for example, long pressing the widget area 209. In other words, the user may change the number of icons that the widget area 209 is able to accommodate into, for example, 4, 12, or an arbitrary number. In yet another embodiment of the invention, the user may further set an icon size by using a setting function of the electronic device 100. Thus, the number of icons that the widget area 209 is able to accommodate may also change.

In an embodiment of the invention, when the display module 101 displays at least one second icon selected from the first icons in an area other than the widget area 209 in the first panel 200, the widget icons displayed in the widget area 209 do not include the second icon. Taking the embodiment of FIG. 5 as an example, at Step S507, when choosing the higher ranked first icons, the processor 105 may skip an icon that is already displayed in the first panel 200. If eight icons are to be chosen and displayed as the widget icons, and one of the eight first icons having the most numbers of clicks in the chosen operation mode is the same as one of the icons displayed in, for example, the fixed tool bar 211 or one of the icons displayed in the area other than the widget area 209 (such as being displayed at a position of an area 201, 203, 205, or 207 (not shown in the figure)), the processor 105 may choose not to display the same icon but display the icon ranked next (i.e., the first icon with the ninth most number of clicks) as the widget icon instead. In other words, the same icon is not displayed in the widget area 209 and the area other than the widget area 209 in the first panel 200 at the same time. It should be noted that, in an embodiment of the invention, when the processor 105 displays a part of the first icons as the widget icons in the widget area 209 by using the display module 101, the order of displayed positions of the respective widget icons is in accordance with the numbers of clicks of the objects corresponding to the respective icons, for example. However, the invention is not limited thereto. In another embodiment of the invention, the order of the widget icons in the widget area 209 is not affected by the numbers of clicks, and the widget icons may be, for example, arranged arbitrarily.

Concerning the timing of updating the widget icons displayed in the widget area 209, in an embodiment of the invention, when the panel displayed by the display module 101 is switched from another panel, such as another panel of the main screen or the panel of the application pool, to the first panel 200 including the widget area 209, the widget icons displayed in the widget area 209 are updated. Besides, in another embodiment, concerning switching of the operation modes and switching of the widget icons displayed in the widget area 209 in correspondence with the switched operation mode, the operation mode may be switched and the widget icons displayed in the widget area 209 may be updated in correspondence with the switching when the panel displayed by the display module 101 is switched from another panel, such as another panel of the main screen or the panel of the application pool, to the first panel 200 including the widget area 209.

Figure 6:
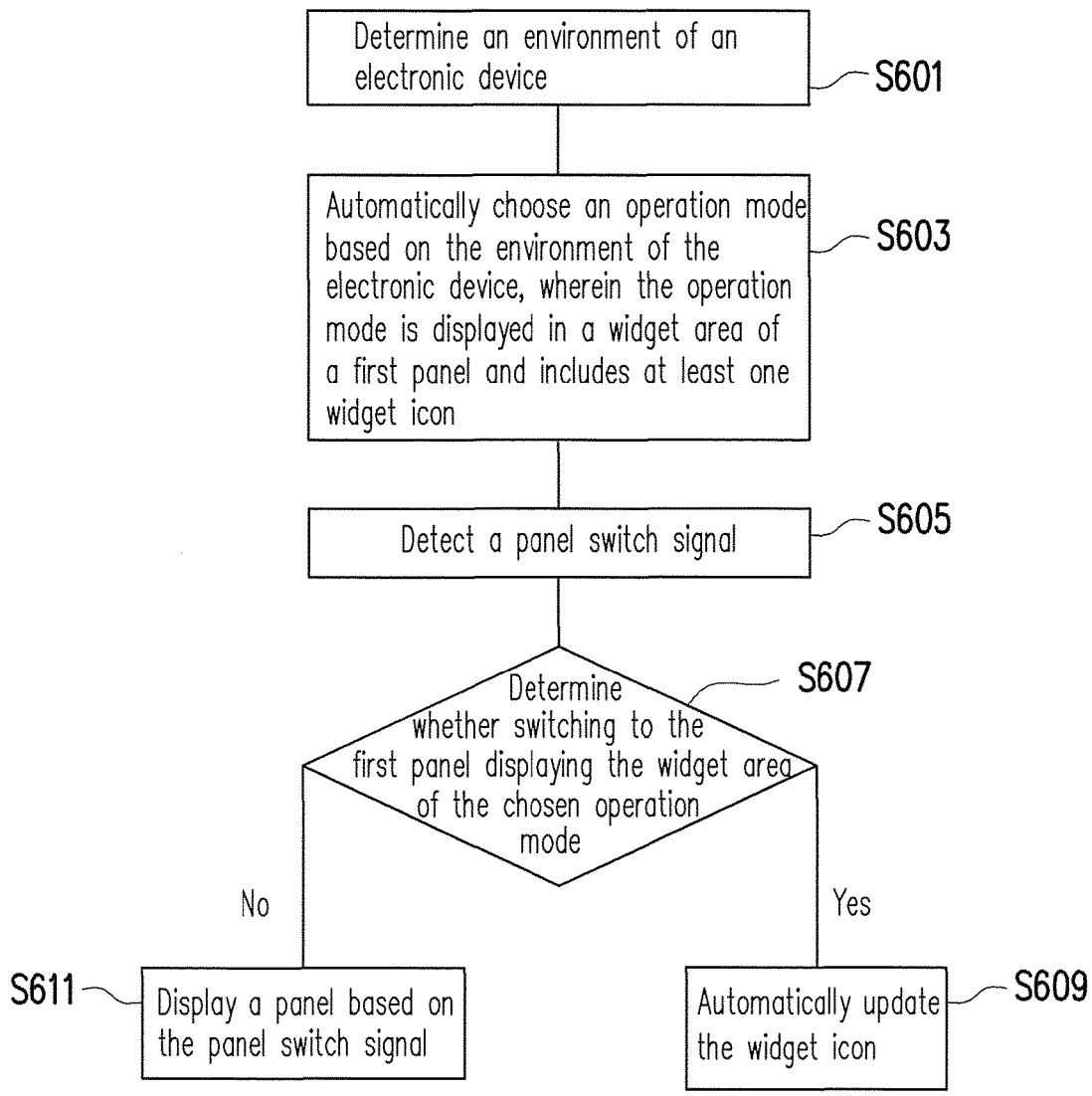
FIG. 6 is a flowchart illustrating a panel displaying method according to another embodiment of the invention.

FIG. 6 is a flowchart illustrating a panel displaying method according to an embodiment of the invention.

Referring to FIG. 6, Step S601 and Step S603 are similar to Step S301 and Step S303 in FIG. 3, and are thus not repeated in the following. In an embodiment of the invention, after the processor 105 of the electronic device 100 chooses the operation mode at Step S603, a panel switch signal is detected at Step S605. The panel switch signal may be generated by a sliding gesture input by the user through the input module 103, a press on a home button, or other input methods. Alternatively, the panel switch signal may be generated by software being executed by the processor 105. The invention does not intend to impose a limitation in this regard. When the processor 105 detects the panel switch signal, at Step S607, the processor 105 may further determine whether the panel displayed by the display module 101 is switched to the first panel 200 including the widget area 209 of the chosen operation mode. If the processor 105 determines that the panel displayed in the display module 101 is not switched to the first panel 200, at Step S611, the processor 105 may display the panel by using the display module 101 based on the panel switch signal. If the processor 105 determines that the panel displayed by the display module 101 switches to the first panel 200, Step S609 is performed. At Step S609, in response to determining that the display module 101 switches to the first panel 200 displaying the widget area 209 of the chosen operation model, the processor 105 may automatically update the widget icons and display the widget icons in the widget area 209 by using the display module 101. Panel displaying processes concerning how the processor 105 chooses to automatically update the widget icons and displays the widget icons are already described in the foregoing, and thus not repeated in the following.

Besides, in an embodiment of the invention, if the first icon is chosen as the widget icon and displayed in the widget area 209, the ranked order or position of the widget icon in the widget area 209 does not change in accordance with changes in the results of calculating the numbers of clicks. This is to prevent the position of the widget icon from being arbitrarily changed that causes the user's inconvenience. The position of the widget icon may instead be manually adjusted by the user by using the input module 103.

For example, the processor 105 originally chooses the eight of the first icons with the most numbers of clicks in the work mode as the widget icons and display the widget icons in the widget area 209. After the user operates the electronic device 100 for a period of time, the number of clicks of the object corresponding to each icon may change. For example, in the work mode, the icon originally having the fifth most number of clicks may now be ranked eighth in the number of clicks. Under such circumstance, the electronic device 100 does not move the widget icon originally displayed at the position corresponding to the fifth most number of clicks to the position corresponding to the eighth most number of clicks, but keeps the widget icon at the position corresponding to the fifth most number of clicks, so that the user may use the icon originally having the fifth most number of clicks at the position the user is used to. Also, for example, the icon originally having the seventh most number of clicks may now be ranked ninth in the number of clicks, so the icon originally having the seventh most number of clicks is supposed to be removed from the widget area, and an icon originally ranked after eighth (e.g., ranked ninth) may now make the top eight (e.g., sixth) in the ranking of numbers of clicks, so the widget area should display the icon originally ranked ninth. Under such circumstance, if the icon originally ranked sixth is still displayed in the widget area, the icon originally ranked ninth does not replace the icon originally ranked sixth, but fill the position available after the icon originally ranked seventh is removed, namely at the position corresponding to the seventh most number of clicks. In another embodiment, the order displayed in the widget area is changed in real-time based on the number of clicks. In yet another embodiment, if the same widget icon is displayed in the widget area of different operation modes, such as in the work mode and the home mode, the widget icon may be synchronously displayed at the same position for the user to click easily.

In addition, even if the processor 105 does not detect the panel switch signal, the user may still manually adjust the widget icons by using the input module 103. More specifically, the user may further generate a choose input signal, a move-in input signal, or a remove input signal by using the input module 103, so as to choose, add, or remove the widget icon in the widget area 209. In an embodiment of the invention, after the operation mode is chosen, the user may drag one (referred to as third icon in the following) of the first icons from the application pool or a position in the main screen other than the widget area to a specific position in the widget area 209, or adjust the position of the widget icon originally in the widget area 209, by using the input module 103. In other words, the user may set up the widget icons in the widget area 209 based on his/her own habit or preference. Thus, after the input module 103 receives the choose input signal, the processor 105 may record the third icon moved to the widget area 209 as the widget icon by the user and the position that the third icon is moved to by, for example, setting an invisible pin, so as to record and fix the position of the widget icon in the chosen operation mode. Unless being removed by the user by using the input module 103, the pin-marked third icon may not be removed from the widget area 209 and the position thereof does not change in the chosen operation mode due to calculation of the number of clicks or other factors when the widget icons are updated. The third icon is retained and displayed at the chosen position in the widget area 209.

In an embodiment of the invention, after the operation mode is chosen, the user may remove the widget icon from the widget area 209 by using the input module 103. In other words, the user may remove the widget icon, such as a widget icon corresponding to a sensitive or private application, on purpose based on the user's habit or preference, and refrain the removed widget icon from being displayed in the widget area in one specific or all of the operation modes again. Thus, in an embodiment of the invention, after the input module 103 receives the remove input signal, in addition to removing the widget icon (referred to as fourth icon in the following) instructed to be removed by the remove input signal, the processor 105 may, for example, further calculate the number of clicks of the object corresponding to the fourth icon from a reference number of times. The reference number of times may be, for example, zero or a negative value less than zero. Thus, even if the number of clicks of the object corresponding to the removed fourth icon increases, the fourth icon may not be displayed again in the widget area 209 of the specific operation mode when the number of clicks of the fourth icon increases. Moreover, in another embodiment, after the input module 103 receives the remove input signal, in addition to removing the widget icon (referred to as fifth icon in the following) instructed to be removed by the remove input signal, the processor 105 may add the object corresponding to the fifth icon removed from the widget area 209 to a blacklist and manage the blacklist, such that the removed fifth icon is not displayed in the widget area 209 of the specific operation mode again.

In an embodiment of the invention, after the operation mode is chosen, the processor 105 may further dispose and fix a specific folder at a specific position of the widget area 209. For example, in the work mode, the processor 105 may fix "download" and "recommendation" folders at the last two positions in the widget area 209. The "download" folder includes, for example, the most recently installed applications, and the "recommendation" folder includes, for example, applications recommended ended by a remote server. The remote server recommends the applications based on, for example, the device information of the electronic device 100 or the user's habit of use. It shall be understood that the invention does not intend to limit the type, number, and contents included therein of the folder that is fixed. In another embodiment of the invention, the user may manually set a plurality of applications, shortcuts, or folders in the same specific folder, and dispose the icon corresponding to the specific folder in the widget area 209.

Following the steps in the embodiment shown in FIG. 3, 5, or 6, the electronic device 100 may automatically choose the operation mode based on the environment thereof, and the chosen operation mode is displayed in the widget area 209 and includes at least one widget icon.

The invention also provides a non-transitory computer readable recording medium recording a computer program. The computer program is adapted to carry out the respective steps in the panel displaying method. The computer program includes a plurality of code segments (e.g., code segments for building up structural figures, code segments for checking tables, code segments for settings, and code segments for configuration). After the code segments are loaded into and executed by the electronic device, the steps of the panel displaying method may be implemented.

In view of the foregoing, the panel displaying method according to the embodiments of the invention determines the operation mode of the electronic device based on the device information of the electronic device. In addition, the device information may allow the electronic device to determine the environment of the electronic device. Then, based on parameters such as frequency and number of clicks, etc., the user's habits of use in the respective operation modes are determined. Then, the applications, shortcuts, or folders are displayed in the widget area of the panel in accordance with the user's habits of use. Accordingly, with the panel displaying method according to the embodiments of the invention, the limited widget area in the panel of the electronic device is effectively used, and the widget icons most likely meeting the user's needs for the time being are displayed in the widget area, making the device more easily to use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A panel displaying method for an electronic device, wherein the electronic device has a plurality of panels, the panel displaying method comprising:
    displaying at least one widget icon in a widget area of a first panel, wherein the widget area selects an operation mode based on an environment of the electronic device;
    displaying a plurality of first icons corresponding to a plurality of objects in a second panel;
    determining the environment of the electronic device according to device information of the electronic device, wherein the device information comprises connection information of the electronic device;
    automatically choosing the operation mode based on the environment of the electronic device, and displaying at least one widget icon corresponding to the chosen operation mode in the widget area of the first panel,
    wherein a portion of the first icons is chosen and updated as the at least one widget icon based on the number of clicks of the objects corresponding to the first icons and being clicked in the chosen operation mode; and
    detecting a choose input signal, wherein the choose input signal instructs to move one of the first icons as a third icon into a specific position of the widget area, wherein when updating the widget icon, not updating a display position of the third icon based on the number of clicks of the third icon but displaying the third icon at the specific position, and displaying other widget icons at positions other than the specific position in the widget area according to the number of clicks of the other widget icons.

2. The method as claimed in claim 1, further comprising:
ranking the first icons from the highest to the lowest based on the number of clicks of the objects corresponding to the first icons and being clicked in the chosen operation mode; and
displaying a higher ranked portion of the first icons as the at least one widget icon.

3. The method as claimed in claim 1, further comprising:
displaying a second icon chosen from the first icons in an area other than the widget area of the first panel;
determining the displayed second icon; and
not displaying the widget icon corresponding to the second icon in the widget area.

4. The method as claimed in claim 1, further comprising:
detecting a remove input signal, wherein the remove input signal corresponds to a fifth icon in the at least one widget icon; and
removing the corresponding fifth icon from the widget area based on the input signal, and adding the object corresponding to the fifth icon to a blacklist, such that the fifth icon is not displayed in the widget area of the chosen operation mode again.

5. The method as claimed in claim 1, wherein the objects comprise an application, a short cut, or a folder.

6. A portable electronic device, comprising:
a display module adapted to display a plurality of panels;
an input module, adapted to receive an input signal;
a storage module, adapted to store a plurality of objects and a plurality of first icons corresponding to the objects; and
a processor, coupled to the display module, the input module, and the storage module, and configured to:
display at least one widget icon in a widget area of a first panel, wherein the widget area selects an operation mode based on an environment of the portable electronic device;
display the plurality of first icons in a second panel;
determine the environment of the portable electronic device according to device information of the portable electronic device, wherein the device information comprises connection information of the portable electronic device;
automatically choose the operation mode based on the environment, and display at least one widget icon corresponding to the chosen operation mode in the widget area of the first panel,
wherein a portion of the first icons is chosen and updated as the at least one widget icon based on the number of clicks of the objects corresponding to the first icons and being clicked in the chosen operation mode; and
detect a choose input signal, wherein the choose input signal instructs to move one of the first icons as a third icon into a specific position of the widget area, wherein when updating the widget icon, not updating a display position of the third icon based on the number of clicks of the third icon but displaying the third icon at the specific position, and displaying other widget icons at positions other than the specific position in the widget area according to the number of clicks of the other widget icons.

7. The portable electronic device as claimed in claim 6, wherein the processor further ranks the first icons from the highest to the lowest based on the number of clicks of the objects corresponding to the first icons and being clicked in the chosen operation mode, and
the display module displays a higher ranked portion of the first icons as the at least one widget icon.

8. The portable electronic device as claimed in claim 6, wherein the display module displays a second icon selected from the first icons in an area other than the widget area of the first panel, and the at least one widget icon displayed in the widget area does not comprise the second icon.

9. The portable electronic device as claimed in claim 6, wherein the processor further detects a remove input signal received by the input module, the remove input signal corresponds to a fifth icon in the at least one widget icon, and
the processor removes the corresponding fifth icon from the widget area based on the remove input signal, and adds the object corresponding to the fifth icon to a blacklist, such that the fifth icon is not displayed in the widget area of the chosen operation mode again.

10. The portable electronic device as claimed in claim 6, wherein the objects comprise an application, a shortcut, or a folder.

11. A non-transitory computer readable recording medium, adapted to record a computer program, wherein the computer program is loaded by an electronic device to perform steps as follows:
displaying at least one widget icon in a widget area of a first panel, wherein the widget area selects an operation mode based on an environment of the electronic device;
displaying a plurality of first icons corresponding to a plurality of objects in a second panel;
determining the environment of the electronic device according to device information of the electronic device, wherein the device information comprises connection information of the electronic device;
automatically choosing the operation mode based on the environment of the electronic device, and displaying at least one widget icon corresponding to the chosen operation mode in the widget area of the first panel,
wherein a portion of the first icons is chosen and updated as the at least one widget icon based on the numbers of clicks of the objects corresponding to the first icons and being clicked in the chosen operation mode; and
detecting a choose input signal, wherein the choose input signal instructs to move one of the first icons as a third icon into a specific position of the widget area, wherein when updating the widget icon, not updating a display position of the third icon based on the number of clicks of the third icon but displaying the third icon at the specific position, and displaying other widget icons at positions other than the specific position in the widget area according to the number of clicks of the other widget icons.

* * * * *